No. 881,675. PATENTED MAR. 10, 1908.
C. J. FISHER.
ENVELOP.
APPLICATION FILED OCT. 8, 1907.
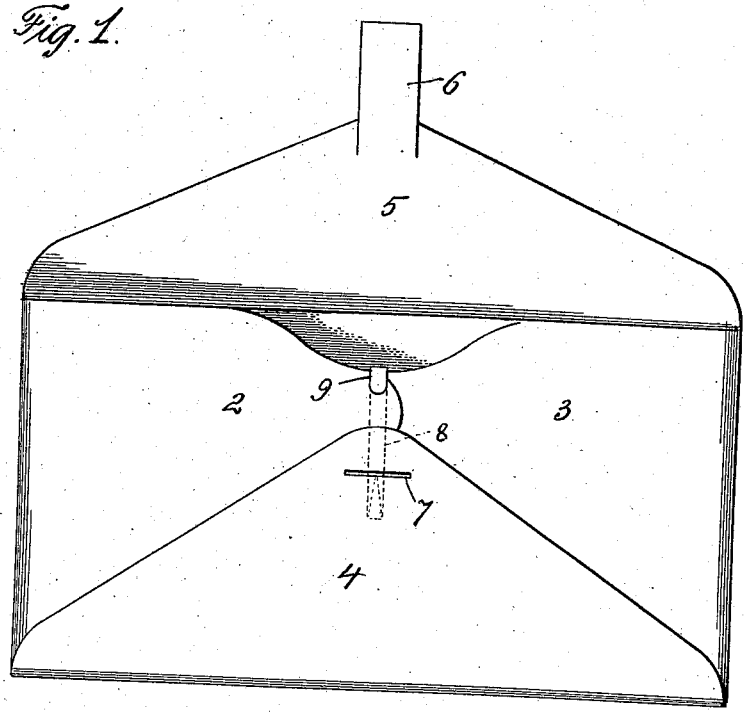
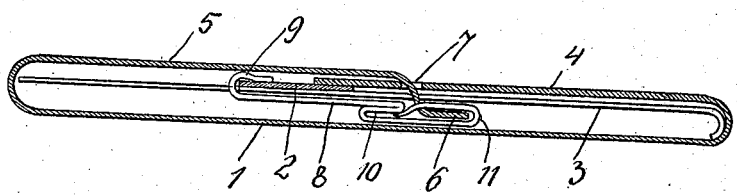
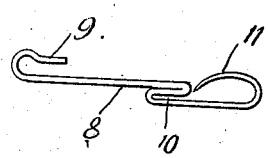
Witnesses
A. H. Rabsag,
O. H. Butler
Inventor
C. J. Fisher,
By H. C. Everett
Attorneys

UNITED STATES PATENT OFFICE.

CHARLES J. FISHER, OF OAKMONT, PENNSYLVANIA.

ENVELOP.

No. 881,675.

Specification of Letters Patent.

Patented March 10, 1908.

Application filed October 8, 1907. Serial No. 396,419.

*To all whom it may concern:*

Be it known that I, CHARLES J. FISHER, a citizen of the United States, residing at Oakmont, county of Allegheny, and State of Pennsylvania, have invented certain new and useful Improvements in Envelops, of which the following is a specification, reference being had therein to the accompanying drawings.

This invention relates to envelops, and the invention has for its object to provide novel means for firmly fastening the flaps of an envelop together, whereby the envelop cannot be tampered with or surreptitiously opened without the act being detected.

The invention aims to provide a fastener that can be used in connection with a simple form of envelop, the fastener being easily applied to an envelop and quickly manipulated to firmly connect the sealing flap of the envelop to the other flaps thereof, whereby either flap cannot be opened without injuring or marring said flaps. To this end, I have devised a metallic fastener, that will not materially add to the weight of the envelop, when the same is transmitted through the mails. The fastener is constructed of a single piece of metal bent to provide a safety pin for retaining the sealing flap of the envelop in a closed position, said safety pin being located within the envelop, whereby access cannot be had to the same without breaking open the envelop.

The detail construction entering into the invention will be presently described and then specifically pointed out in the appended claims.

In the drawings: Figure 1 is an elevation of an envelop constructed in accordance with my invention, Fig. 2 is an enlarged cross sectional view of the envelop, and Fig. 3 is an enlarged view of the envelop fastener.

In the drawings, 1 designates the body of the envelop having overlapping end flaps 2 and 3, a bottom flap 4 and a sealing flap 5, said sealing flap carrying an integral tongue 6 adapted to fit in the slot or slit 7 provided therefor in the bottom flap 4.

The envelop fastener is constructed of a strip of metal 8 having one end bent to provide a hook 9, while the opposite end is bent to provide a socket 10 and a safety pin 11.

The fastener is placed within the envelop with the hooked shaped end 9 of the fastener engaging the meeting ends of the flaps 2 and 3, and said fastener is made of a sufficient length to allow the safety pin 11 to extend below the slot or slit 7. When the sealing flap 5 is closed and the tongue 6 inserted in the slot or slit 7, the tongue 6 passes under the safety pin 11, and when said safety pin is pressed to close the same, said pin passes through the tongue 6 and enters the socket 10.

It is an extremely easy operation to close the safety pin 11, and it is impossible to open the same unless the flaps of the envelop and the tongue thereof are mutilated.

The fastener can be used numerous times in connection with envelops, but I desire to make the same of an inexpensive malleable metal whereby the fastener can be discarded after it has once been used.

Besides the fastener being applicable to the ordinary envelop for carrying letters, said fastener can be made of a sufficient size to be used in connection with large document holders and packages ordinarily closed by a flap.

Having now described my invention what I claim as new, is:—

The combination with an envelop having a sealing flap provided with a tongue adapted to extend inwardly of the rear flap of the envelop, of a fastening device for the sealing flap, said device comprising a single strip of material having its upper end bent to constitute a hook adapted to engage over the edge of the end flaps of the envelop, said strip further bent intermediate of its ends to constitute a socket and further having its other end bent to constitute a safety pin adapted to penetrate the tongue and engage in the socket thereby fastening the flaps of the envelop together.

In testimony whereof I affix my signature in the presence of two witnesses.

CHARLES J. FISHER.

Witnesses:
MAX H. SROLOVITZ,
C. A. RENZIEHAUSEN.